Jan. 19, 1960 N. P. NILSEN 2,921,556
POULTRY WATERING APPARATUS
Filed Aug. 27, 1956 2 Sheets-Sheet 1
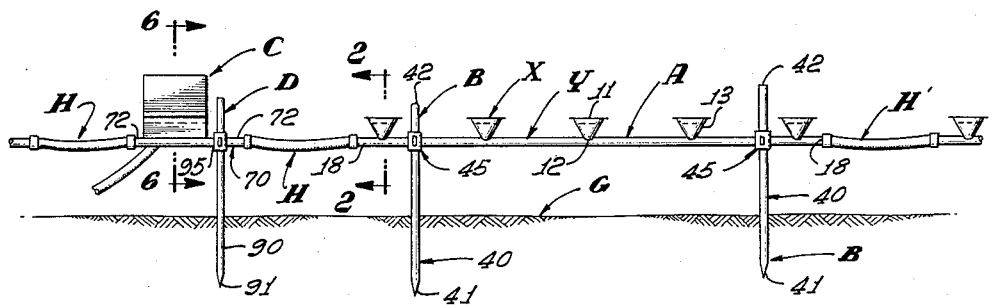
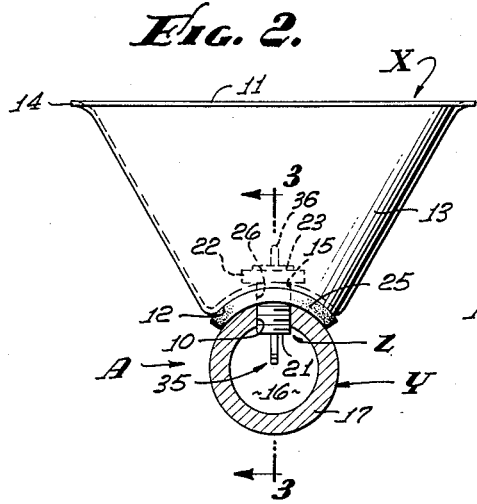
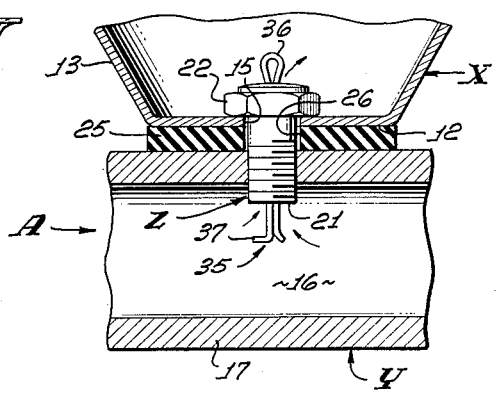
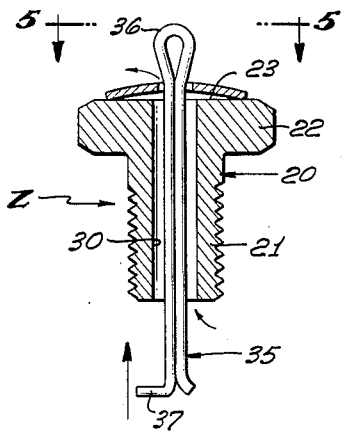
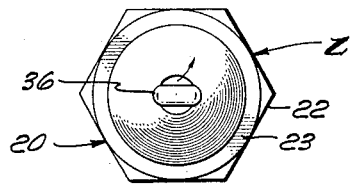
INVENTOR.
NORMAN P. NILSEN
BY
W. H. Maxwell
AGENT.

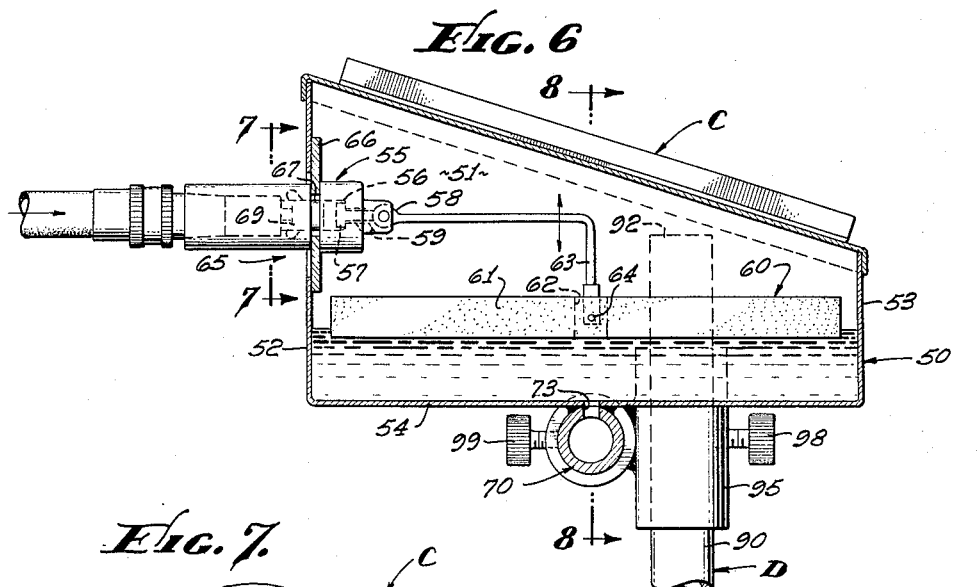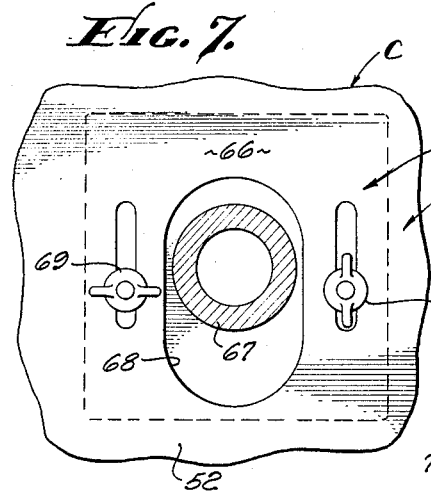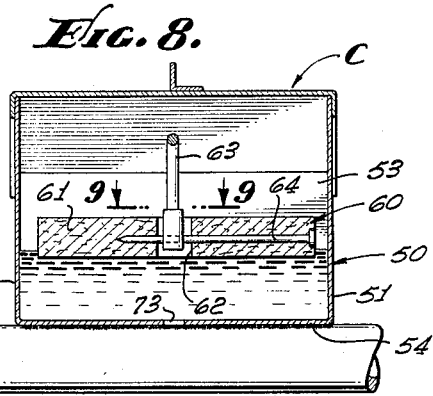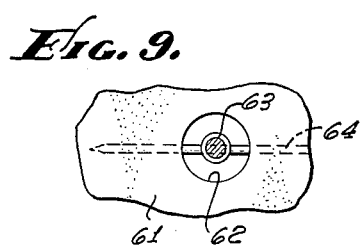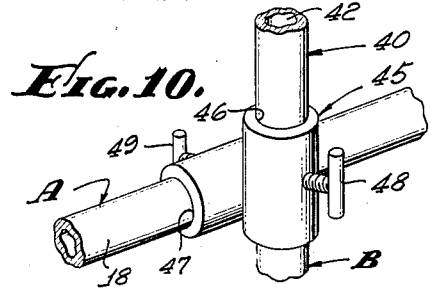

United States Patent Office 2,921,556
Patented Jan. 19, 1960

2,921,556

POULTRY WATERING APPARATUS

Norman P. Nilsen, Phelan, Calif.

Application August 27, 1956, Serial No. 606,260

13 Claims. (Cl. 119—74)

This invention relates to the watering of poultry, and in particular, it has to do with the feeding of water to said poultry, it being a general object of this invention to provide a simple and inexpensive apparatus of the type under consideration that is easily handled and which can be economically maintained.

The raising of poultry, for example chickens, requires the feeding and watering of fowl from the time that they hatch until they are mature. The specific requirements for feeding and watering changes constantly as the fowl grow with the result that different equipment and techniques are ordinarily necessary for fowl of different maturity. That is, an ordinary watering trough that is usable by mature fowl is too high and cannot be reached by young fowl. Also, a trough that is adjusted for young fowl is not desirable for use with mature fowl, for example mature fowl will walk or step into the trough if it is too low resulting in a wet floor condition. With a wet or damp floor, fungus and bacterial growths will occur resulting in inferior and sickly poultry.

Dryness and cleanliness are important factors in the raising of poultry. It is important to keep the poultry quarters dry and sanitary, and to keep the waterer clean. It is also desirable to feed the fowl only as much water as they need, for if too much water is available, they will throw it about with their beaks, etc. Further, the presence of feed or mash will settle in an ordinary waterer with the result that constant manual cleaning is required.

Ease of handling the equipment is also an important factor in the raising of poultry. It is desirable to provide a versatile easily manipulated watering apparatus that is adapted to be used in feeding fowl of all maturity. It is desirable to provide a waterer that requires a minimum of attention and which insures a dry, clean, and sanitary ground or floor condition.

An object of this invention is to provide a waterer for use in poultry brooders that is versatile and flexible and which can be adjusted to serve in the feeding of fowl of any maturity. The waterer that I provide involves the use of cups that can be raised and lowered and provides for raising and lowering the level of water in the cups. In order to feed or water newly hatched chicks, the water is lowered to a minimum height and the water level therein raised. In order to feed or water the chicks as they mature, it is merely necessary to lower the water level in the cups, and to raise the height of the cups.

Another object of this invention is to provide a waterer that is self cleaning. The particular shape and size of the waterer cup that I provide results in cleaning out the cup as it is used by the fowl. With my waterer cup, only a small amount of water is contained in the cup, and as the fowl reach for the water, they instinctively clean the sides and the bottom of the cup.

It is another object of this invention to provide a waterer that will not clog. The structure that I provide includes a shiftable element that reciprocates to clean and clear the water passage that leads to the cup. The said shiftable element is instinctively engaged by and operated by the fowl as they drink or feed from the cup.

It is still another object of this invention to provide an apparatus of the character referred to that is easily augmented or increased in size and capacity, as circumstances require. The cups that I provide are easily leveled, and the water level therein is quickly and accurately controlled. Further, the cups or cup carrying units of the watering apparatus are joined by flexible hose so that any desired arrangement of cups, waterers, or units can be attained.

It is an object of this invention to provide a water level control for a waterer of the type under consideration that is accurate and dependable in operation. With my control, the exact level of water is maintained in the watering cups regardless of varying fluid supply pressures.

It is still another object of this invention to provide an inexpensive and practical apparatus of the type above referred to that is improved over waterers heretofore employed in the poultry industry.

The various objects and features of this invention will be fully understood from the following detailed description of a typical preferred form and application of this invention, throughout which description reference is made to the accompanying drawings, in which:

Fig. 1 is an elevational view showing the manner in which the apparatus of the present invention may be employed. Fig. 2 is an enlarged sectional view taken as indicated by line 2—2 on Fig. 1. Fig. 3 is an enlarged detailed sectional view taken as indicated by line 3—3 on Fig. 2. Fig. 4 is an enlarged detailed sectional view of a part of the structure shown in Fig. 3. Fig. 5 is a plan view taken as indicated by line 5—5 on Fig. 4. Fig. 6 is an enlarged sectional view taken as indicated by line 6—6 on Fig. 1. Fig. 7 is an enlarged detailed view taken as indicated by line 7—7 on Fig. 6. Fig. 8 is a sectional view taken as indicated by line 8—8 on Fig. 6. Fig. 9 is a view of a portion of the structure taken as indicated by line 9—9 on Fig. 8, and Fig. 10 is a perspective view of a portion of the structure shown in Fig. 1.

The particular apparatus of the present invention is intended primarily for use in the watering of a large number of fowl. In the raising of chickens, I find the apparatus of the present invention to be useful for the entire period of a chicken's life that is, from the time the chicken is hatched and through maturity. Poultry quarters may vary widely without affecting the apparatus that I provide, for example the quarters may be open or may be in the form of cages raised above the ground level, or they may be simple hut shaped buildings for ground level operation. The apparatus shown in the drawings is intended for use with the latter type of quarters and is supported by the ground level G.

The watering apparatus that I provide involves, generally, waterer units A, a support B for the units A, a water level control C for the units A, and a support D for the control C. The number of water units A may vary widely as they are required, and each unit is carried by its support B. The water level control C is preferably supported separate from the units A, and it is a feature of the invention to connect the control C, and units A, either directly, or through suitable lengths of flexible hose H. Also, when one unit A is connected to another unit A, the connection is made through a suitable length of flexible hose H.

The waterer units A are essentially like units and each involves one or more waterer cups X carried by a manifold Y. In preferred form of the invention, the manifold Y is provided with a series of vertically disposed openings 10, each of which is for supplying water to a cup X, The units A also involve a coupling Z that is adapted to secure the cups X to the manifold Y, as shown, and sealing means S adapted to make the connections between the cups X and manifold Y water tight. As shown, in the drawings, the units A may involve five cups X equally spaced about ten or twelve inches apart.

The cups X are provided to receive and dispense water from the manifold, and each is vertically disposed vessel shaped part open at its top 11 and provided with a bottom 12 for supporting engagement with the manifold Y. The cup is cone shaped with outwardly flared side walls 13 that terminate at the top 11, the top 11 being in the form of a flat horizontally disposed peripheral flange 14. In practice, the top 11 of the cup X is approximately three inches in diameter and tapers inwardly toward the bottom 12 being approximately one inch in diameter. This particular configuration has been found to be successful in the raising of chickens, the cup X being a metal cup, for example of brass or the like.

In practice, the bottom 12 of the cup X is formed or shaped to seat on the exterior of the manifold Y. As clearly illustrated in Figs. 2 and 3, the manifold Y is of the cross section of an ordinary pipe, and the bottom 12 is convex or upwardly curved to the end that the bottom 12 will have coextensive seating engagement with the exterior of the manifold Y. Also, in accordance with the invention, the bottom 12 is provided with a central opening 15 adapted to pass the coupling Z.

The manifold Y of the unit A is provided to carry the cup X, and to conduct water thereto, and is preferably a simple elongate piece of pipe or the like. The manifold Y is round in cross section, and has a central water conducting channel 16 therethrough opening at both ends thereof. The spaced openings 10 enter the side wall 17 of the manifold Y and are threaded openings for receiving the coupling Z. As indicated, the end portions 18 of the manifold are threaded to receive hose fittings for connection with the hoses H and H', as circumstances require.

The coupling Z of the unit A is provided to join or secure the cup X to the manifold Y and to direct water from the channel 16 to the interior of the cup. The coupling Z is a fastener type fitting having a body 20 with a straight shank 21 and a head 22. The shank 21 is adapted to pass through the opening 15 in the bottom of the cup and is threadedly engaged in the opening 10 in the manifold. The head 22 is larger in diameter than the shank 21 and engages the bottom 12 inside the cup X to draw the cup into tight engagement with the manifold Y.

In accordance with the invention, I provide the seal S that acts between the cup X and manifold Y to prevent leakage between the cup and the manifold. As clearly shown, the seal S is a simple gasket type of seal that is compressed between the parts to be sealed. The seal S is preferably a disc shaped body 25 of pliant rubber or like material, and is provided with a central opening 26 to pass the shank 21 of the coupling Z. It will be apparent how the pliant body 25 is flexible and conforms to a concavo convex shape to be compressed between the bottom 12 and wall 17 of the cup X and manifold Y respectively.

The coupling Z directs water to the cup X for this purpose is provided with a fluid conducting passage 30. The passage 30 is in the form of a bore that extends through the shank 21 opening downwardly at the lower end of the shank and opening upwardly at the upper face 23 of the head 22. The coupling Z conducts water from the channel 16 through the passage 30 and into the vessel shaped cup X, the passage 30 being in open communication at all times between the manifold and cup.

In accordance with the present invention, I provide means G to clear and clean the passage 30. The means G that I provide relies upon the instinctive action and habits of the fowl that use the waterer cup. That is, the fowl will peck or pick at an object, especially a loose object. Therefore, the means G involves a shiftable element 35 with a top 36 that projects upwardly to attract the eye of the fowl so that the fowl will peck at the element to shift it. The element 35 is preferably a straight rod shaped part that extends through the passage 30. The top or head occurs at the head 22 above the face 23, and is an enlarged part that normally occurs adjacent the top or head of the head 22 to rest on the face 23.

The rod shaped element 35 depends from the lower end of the shank 21 where it carries a stop 37 adapted to limit upward movement or travel of the element 35. In practice, the element 35 and top 36 are conveniently formed by employing a cotter key or the like, as shown. When the fowl peck at the top 36, the element 35 is lifted and the lifting and dropping of the element 35 by the fowl results in repeated reciprocating of the means G whereby the passage 30 is kept free and clear of any foreign particles or materials by friction or rubbing of the relatively moving parts.

The support B for the waterer units A is provided to adjustably support the units above the ground G at the desired level. The support B is illustrated in Figs. 1 and 10 of the drawings, and involves, generally, a stake 40, and a slide 45. In practice, I employ a pair of supports B to carry a single unit A (see Fig. 1) in which case, a pair of stakes 40 are driven in the ground G a suitable distance apart, as shown. The stakes 40 may be any rod shaped element preferably pointed at the lower end 41 thereof and with a flat top 42. It will be apparent that the stakes are adapted to be driven into the ground by means of a hammer or sledge.

The slide 45 involves a body that is shiftable vertically of the stake 40 and longitudinally of the manifold Y. A vertical bore 45 is provided in the body of the slide to engage over the stake 40, and a horizontal bore 47 is provided in the body to slideably engage over the manifold Y. Suitable thumb screws 48 and 49 engage with the stake 40 and manifold Y respectively to hold the slide in the desired selected position. It will be apparent that the manifold may be adjusted horizontally as well as vertically in order to position the cups X most advantageously, and as circumstances require.

The water level control C of the present invention is provided to control the supply and level of water delivered to the waterer units A. As illustrated, the control C is adapted to control the supply and the water level of all of the cups X involved and is a single control C that handles the said cups. The water level control C involves, generally, a reservoir 50, a valve 55, a float 60, an adjusting means 65 and a supply manifold 70.

The reservoir 50 is preferably a box shaped part with sides 51, a front end 52, a back end 53, and a bottom 54. The reservoir 50 may be advantageously formed of sheet metal or the like, the sides, ends, and bottom being flat plate-like elements suitably joined together at the adjoining marginal edges thereof. It will be apparent that a level of water may be maintained in the reservoir 50 parallel with the bottom 54 thereof.

The valve 55 may vary widely and is shown as involving a body having a seat 56 and carrying a shiftable valve element 57. A cam 58 is rotatably carried by the valve body and is operable into engagement with a stem on element 57 to lift the element from the seat 56. A discharge port 59 is provided in the valve body to direct the flow of water into the reservoir 50.

The float 60 that operates the valve 55 is, in accordance with the invention, adapted to provide quick and accurate valve action that is not possible with common ordinary float valve constructions. As shown, the float 60 is of maximum size commensurate with the size of reservoir 50 and substantially occupies the reservoir in plan view. As clearly illustrated in Figs. 6 and 8, the float 60 is slightly narrower and slightly shorter than the reservoir 50, and, therefore, has maximum bouyancy. In practice, the float 60 is made or formed of a body 61 of cellular material that is extremely light in weight and which is rigid. The body 61 is flat having an opening 62 preferably at the center thereof, and passing or extending through the body between the top and bottom thereof. An operating rod 63 extends from the cam 58 of the valve 55 to enter the opening 62 where it is pivotally connected to the float by means of a horizontally disposed transversely extending pin 64. It will be apparent that the changing water level in the reservoir 50 will raise and lower the float 60 in order to shift the rod 63 to rotate the cam 58. Rotation of the cam 58 is effected by the relatively short level arm of rod 63 that is actuated from the center of the float 60 which is of maximum bouyancy, thus resulting in accurate and dependable operation of the valve 55.

The adjusting means 65 is provided to alter the water level within the reservoir 50, and, as shown, involves a shiftable mounting plate 66 that carries the valve 55. In Figs. 6 and 7, I have shown the plate 66 supported at the inner side of the front end 52 of the reservoir. The plate 66 is a flat plate, the valve body having a tubular body extension 67 that projects through the plate 66 and through an opening 68 in the front end 52 of the reservoir. The opening 68 is an elongate vertically disposed opening to allow for vertical adjustment or shifting of valve 55. The plate 66 is shiftable relative to the reservoir 50 and is selectively positioned by means of suitable fasteners 69. The fasteners 69 are preferably in the form of threaded studs that project from the plate 66 through vertically disposed elongate slots in the end 52, there being wing nuts, or the like, threaded on to the studs and engageable with the end 52 to clamp the plate 66 in the desired position.

The supply manifold 70 is provided to receive water from the reservoir 50 and to distribute the water to the waterer units A. In practice, the manifold 70 is a simple duct shaped part tubular in cross section, and is located beneath the bottom 54 of the reservoir. The manifold 70 is secured in position by means of welding, or brazing, or the like. The manifold shown is a straight double ended manifold with threaded end portions 72 adapted to couple with hoses H that carry the water to the units A. A port 73 is provided in the bottom 54 of the reservoir and communicates with the manifold to the end that the water level established in the reservoir 50 is also established in the plurality of cups X of the several units A.

The support D for the water level control C is provided to adjustably support the control C above the ground G at the desired level. The support D illustrated in Figs. 1 and 6 of the drawings involves, generally, a stake 90, and a slide 95. In practice, I employ a single support D to carry the control C, and like the support B, the stake 90 may be any rod shaped element preferably pointed at the lower end 91 thereof, and with a flat top 92. The slide 95 like the slide 45 involves a body that is shiftable vertically of the stake 90 and longitudinally of the manifold 70. Suitable thumb screws 98 and 99 engage with the stake 90 and manifold 70 respectively to hold the slide in the desired selected position. It will be apparent that the control C may be adjusted to the desired vertical position relative to the waterer units A as required.

From the foregoing, it will be apparent that the poultry watering apparatus of the present invention is a simple and inexpensive apparatus that can be easily and economically maintained. It is a simple matter to employ the desired number of waterer units A and to adjust them vertically as particular circumstances require. When the cups X are in use by the fowl, they are automatically cleaned by the instinctive action of the fowl due to the particular shape of the cup that I provide. Concentrated action of the fowl at the bottom of the cups results in eating back of any feed or mash that may settle or occur in the cups. Further, the shield and reciprocating element of the structure that I provide is operated by the fowl to clear the water supply passage that fills the cup. When it is desired to alter or change the water level in the cups, it is merely necessary to adjust the heighth of the valve 55 relative to the reservoir 50. The latter adjustment is easily made and is accurately accomplished by shifting of the plate 60, the exact distance required.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A self cleaning poultry waterer cup of the character described including, an upwardly open vessel having a bottom with a passage therethrough and in communication with a water supply, and a passage cleaning means including a freely reciprocable element of smaller size than and shiftably carried in the passage for limited movement and with a head exposed within the vessel at the bottom thereof for manipulation by the poultry.

2. A self cleaning poultry waterer cup of the character described including, an upwardly open vessel having a bottom with a passage therethrough and in communication with a water supply, and a passage cleaning means including a freely reciprocable element of smaller size than and shiftably carried in the passage for limited movement and with a head exposed at the upper end thereof and accessible within the vessel at the bottom thereof for manipulation by the poultry.

3. A self cleaning poultry waterer cup of the character described including, an upwardly open vessel having a bottom with a passage therethrough and in communication with a water supply, and a passage cleaning means including a freely reciprocable element of smaller size than and shiftably carried in the passage and with a head exposed at the upper end thereof and accessible within the vessel at the bottom thereof for manipulation by the poultry and with a stop at the lower end thereof limiting upward movement.

4. A self cleaning poultry waterer cup of the character described including, an upwardly open vessel having a bottom with a passage therethrough and in communication with a water supply, and a passage cleaning means including, a freely reciprocable element of smaller size than and shiftably carried in the passage for limited movement and with a head exposed within the vessel at the bottom thereof for manipulation by the poultry, and a shield beneath said head and with an opening freely passing said element and overlying the said passage where it enters the vessel.

5. A self cleaning poultry waterer cup of the character described including, an upwardly open vessel having a bottom with a passage therethrough and in communication with a water supply, and a passage cleaning means and including, a freely reciprocable element of smaller size than and shiftably carried in the passage for limited movement and with a head exposed at the upper end thereof and accessible within the vessel at the bottom thereof for manipulation by the poultry, and a shield beneath the head and passing the said element and overlying the said passage where it enters the vessel.

6. A self cleaning poultry waterer cup of the character described including, an upwardly open vessel having a bottom with a passage therethrough and in communication with a water supply, and a passage cleaning means and including, a freely reciprocable element of smaller size than and shiftably carried in the passage and with a head exposed at the upper end thereof and accessible within the vessel at the bottom thereof for manipulation by the poultry and with a stop at the lower end and limiting upward movement thereof, and a shield beneath the head and passing the said element and overlying the said passage where it enters the vessel.

7. A self cleaning unit for use in poultry watering including, an elongate manifold round in cross-section and with a channel extending therethrough and in communication with a water supply, a waterer cup carried by the manifold and including, an upwardly open vessel having a concaved bottom seated on the round exterior of the manifold, there being an opening through the bottom of the vessel, and coupling passed through said opening and coupled to the manifold and having a passage conducting water from the said channel to the vessel.

8. A self cleaning unit for use in poultry watering including, an elongate manifold round in cross-section and with a channel extending therethrough and in communication with a water supply, a waterer cup carried by the manifold and including, an upwardly open vessel having a concaved bottom seated on the round exterior of the manifold, there being an opening through the bottom of the vessel, a coupling passed through said opening and coupled to the manifold and having a passage conducting water from the said channel to the vessel, and a concave-convex seal surrounding the coupling and between the concaved bottom of the vessel and the exterior of the manifold.

9. A self cleaning unit for use in poultry watering including, an elongate manifold round in cross-section and with a channel extending therethrough and in communication with a water supply, a waterer cup carried by the manifold and including, an upwardly open vessel having a bottom with an opening therethrough and seated on the manifold, a coupling passed through said opening and coupled to the manifold and having a passage conducting water from the said channel to the vessel, and a passage cleaning means and including a freely reciprocable element shiftably carried in the passage for limited movement and with a head at the upper end thereof and exposed within the vessel for manipulation by the poultry.

10. A self cleaning unit for use in poultry watering including, an elongate manifold round in cross-section and with a channel extending therethrough and in communication with a water supply, a waterer cup carried by the manifold and including, an upwardly open vessel having a bottom with an opening therethrough and seated on the manifold, a coupling passed through said opening and coupled to the manifold and having a passage conducting water from the said channel to the vessel, and a passage cleaning means and including a freely reciprocable element shiftably carried in the passage and with a head exposed at the upper end thereof and accessible within the vessel for manipulation by the poultry and with a stop at the lower end for limiting upward movement thereof.

11. A self cleaning unit for use in poultry watering including, an elongate valve manifold round in cross-section and with a channel extending therethrough and in communication with a water supply, a waterer cup carried by the manifold and including, an upwardly open vessel having a bottom with an opening therethrough and seated on the manifold, a coupling passed through said opening and coupled to the manifold and having a passage conducting water from the said channel to the vessel, and a passage cleaning means and including, a freely reciprocable element shiftably carried in the passage for limited movement and with a head exposed within the vessel at the bottom thereof for manipulation by the poultry, and a shield passing the said element and overlying the said passage where it enters the vessel.

12. A self cleaning unit for use in poultry watering including, an elongate manifold round in cross-section and with a channel extending therethrough and in communication with a water supply, a waterer cup carried by the manifold and including, an upwardly open vessel having a bottom with an opening therethrough and seated on the manifold, a coupling passed through said opening and coupled to the manifold and having a passage conducting water from the said channel to the vessel, and a passage cleaning means and including, a freely reciprocable element shiftably carried in the passage for limited movement and with a head at the upper end thereof accessible within the vessel for manipulation by the poultry, and a shield beneath the head and passing the said element and overlying the said passage where it enters the vessel.

13. A self cleaning unit for use in poultry watering including, an elongate manifold round in cross-section and with a channel extending therethrough and in communication with a water supply, a waterer cup carried by the manifold and including, an upwardly open vessel having a bottom with an opening therethrough and seated on the manifold, a coupling passed through said opening and coupled to the manifold and having a passage conducting water from the said channel to the vessel, and a passage cleaning means and including, a freely reciprocable element shiftably carried in the passage and with a head at the upper end and accessible within the vessel at the bottom thereof for manipulation by the poultry and with a stop at the lower end and limiting upward movement thereof, and a shield passing said element and overlying the said passage where it enters the vessel.

References Cited in the file of this patent

UNITED STATES PATENTS

| | | |
|---|---|---|
| 465,038 | Allis | Dec. 15, 1891 |
| 491,077 | Carroll | Feb. 7, 1893 |
| 648,922 | Chace | May 8, 1900 |
| 724,299 | Knobel | Mar. 31, 1903 |
| 1,475,403 | Mitchell et al. | Nov. 27, 1923 |
| 1,642,926 | Imschweiler | Sept. 20, 1927 |
| 1,646,246 | Hazard | Oct. 18, 1927 |
| 1,787,544 | Null | Jan. 6, 1931 |
| 1,811,375 | Wysong | June 23, 1931 |
| 1,982,062 | Matthews | Nov. 27, 1934 |
| 2,496,030 | Winey | Jan. 31, 1950 |
| 2,525,453 | Hankin | Oct. 10, 1950 |
| 2,614,531 | Futterer | Oct. 21, 1952 |
| 2,790,417 | Brembeck | Apr. 30, 1957 |

FOREIGN PATENTS

| | | |
|---|---|---|
| 688,836 | Great Britain | Mar. 18, 1953 |